United States Patent [19]

Takahashi et al.

[11] Patent Number: 5,451,427
[45] Date of Patent: * Sep. 19, 1995

[54] MAGNETIC RECORDING MEDIUM AND METHOD OF PRODUCING THE SAME

[75] Inventors: Kiyoshi Takahashi, Ibaraki; Mikio Murai, Hirakata; Masaru Odagiri, Kawanishi, all of Japan

[73] Assignee: Matsushita Electric Industrial Co., Ltd., Osaka, Japan

[*] Notice: The portion of the term of this patent subsequent to Jun. 21, 2011 has been disclaimed.

[21] Appl. No.: 46,712

[22] Filed: Apr. 16, 1993

Related U.S. Application Data

[62] Division of Ser. No. 739,316, Aug. 1, 1991, abandoned.

[30] Foreign Application Priority Data

Aug. 9, 1990 [JP] Japan .................. 2-212547
Jan. 9, 1991 [JP] Japan .................... 3-1149
Apr. 15, 1991 [JP] Japan .................. 3-82274

[51] Int. Cl.$^6$ .............................. G11B 5/00
[52] U.S. Cl. .................... 427/130; 427/128; 427/131; 427/398.1; 427/534; 427/576; 427/577; 428/694 TC
[58] Field of Search ............ 427/130, 398.1, 576, 427/577, 534, 131, 128; 428/694 TC

[56] References Cited

U.S. PATENT DOCUMENTS

| | | | |
|---|---|---|---|
| 3,213,825 | 10/1965 | Cooper et al. | 118/774 |
| 4,624,214 | 11/1986 | Suzuki et al. | 118/719 |
| 4,717,622 | 1/1988 | Kurokawa et al. | 428/408 |
| 4,833,031 | 5/1989 | Kurokawa et al. | 428/336 |
| 5,322,716 | 6/1994 | Takahashi et al. | 427/535 |

FOREIGN PATENT DOCUMENTS 3-37826 2/1991 Japan .

*Primary Examiner*—Stevan A. Resan
*Attorney, Agent, or Firm*—Wenderoth, Lind & Ponack

[57] ABSTRACT

With the use of a novel method in which after a magnetic recording medium carrying a ferromagnetic metal thin film is heated, a protective layer is developed on the ferromagnetic metal thin film by a known plasma CVD technique while an out gas from the magnetic recording medium being eliminated by absorption, another method in which a ferromagnetic metal thin film and a protective layer are formed in succession within a vacuum chamber, or a further method in which after a non-magnetic substrate is heated, a ferromagnetic metal thin film and a protective layer are formed in succession within a vacuum chamber while an out gas from the non-magnetic substrate and the ferromagnetic metal thin film being eliminated by absorption, the atomic ratio of the hydroxyl group to a primary component metal element contained in the ferromagnetic metal thin film can be decreased at the interface between the ferromagnetic metal thin film and the protective layer.

2 Claims, 5 Drawing Sheets

MAGNETIC RECORDING MEDIUM AND METHOD OF PRODUCING THE SAME

This is a Rule 60 Divisional of Ser. No. 07/739,316, filed on Aug. 1, 1991 now abandoned.

BACKGROUND OF THE INVENTION

1. Field of the Invention

The present invention relates to a magnetic recording medium of metal thin film type and more particularly, a magnetic recording medium capable of optimizing the property of a protective layer which is developed over a magnetic recording layer for improvement in the practical use and a method of producing the same.

2. Description of the Prior Art

A magnetic recording medium of ferromagnetic metal has been known which is formed by developing a layer of metal alloy containing Co, Ni, Fe, or their combination on a substrate of non-magnetic material, e.g. polyester film, polyimid film, or other polymer film, by a conventional method such as vacuum vapor deposition, sputtering, ion plating, or the like. Such a known magnetic recording medium is capable of increasing the recording density as compared with a coating-type magnetic recording medium. For ensuring high density recording, it is essential that operational error during recording and reproducing is minimized, spacing loss between magnetic head and recording medium is eliminated, and practical durability is increased. However, the metal thin film type magnetic recording medium has a layer of thin film of metal material which is too thin to provide a desired degree of durability. Particularly, the thin film metal is low in the resistance to corrosion and will easily be affected. For improvement, techniques have been proposed in which the thin film of metal material is coated with a protective layer which is in turn covered with a lubricant layer as a top coating. Also, an improved method has been invented by us (as described in U.S. patent application Ser. No. 521,987 filed on May 11, 1990) in which prior to development of a protective layer, impurities including occluded water are removed in the form of an out gas from the thin film of ferromagnetic metal material by heating so that the bonding strength between the ferromagnetic metal thin film and the protective layer can be increased.

Unfortunately, the out gas removed from the magnetic recording medium tends to pollute the surface of the protective layer, thus interrupting the coupling between the protective layer and the lubricant layer. This will result in head clogging during use of the magnetic recording medium. Also, moisture released from a non-magnetic substrate of the magnetic recording medium is trapped between the ferromagnetic metal thin film and the protective layer at a stage of forming the protective layer, reducing the bonding strength inbetween. As the result, the still frame life (or resistance to corrosion) of the finished magnetic recording medium after storage under high-temperature and high-moisture conditions will be declined. This is disadvantageous to the quality of the magnetic recording medium. It was found that the hydroxyl group (OH radical) existing at the interface between the ferromagnetic metal thin film and the protective layer exhibited an atomic ratio of more than 0.2 to a primary component metal element contained in the ferromagnetic metal thin film.

SUMMARY OF THE INVENTION

It is an object of the present invention to provide a magnetic recording medium which is improved in the resistance to corrosion and contributes to the reduction of head clogging in use, thus ensuring high reliability for practical operation.

For producing such an improved magnetic recording medium, the present invention provides a novel method in which while a magnetic recording medium having a ferromagnetic metal thin film formed on a non-magnetic substrate is heated and the resultant out gas is absorbed by a very-low-temperature panel, a protective layer is developed on the ferromagnetic metal thin film, another method in which a ferromagnetic metal thin film and a protective layer are formed in succession within a vacuum chamber, and a further method in which while a non-magnetic substrate is heated and the resultant out gas is absorbed by a very-low-temperature panel, a ferromagnetic metal thin film and a protective layer are formed in succession within a vacuum chamber. The absorption of the out gas by the very-low-temperature panel may be performed at least before or during or after forming the protective layer. As the result, the atomic ratio of the hydroxyl group (OH radical) to a primary component metal element contained in the ferromagnetic metal thin film can be decreased at the interface between the ferromagnetic metal thin film and the protective layer.

In particular, the atomic ratio of the hydroxyl group to the primary component metal element of the ferromagnetic metal thin film is reduced to less than 0.2. Accordingly, the magnetic recording medium will be much increased in the resistance to corrosion, thus contributing to the reduction of head clogging.

PREFERRED EMBODIMENTS OF THE INVENTION

Example 1

Figure 1:
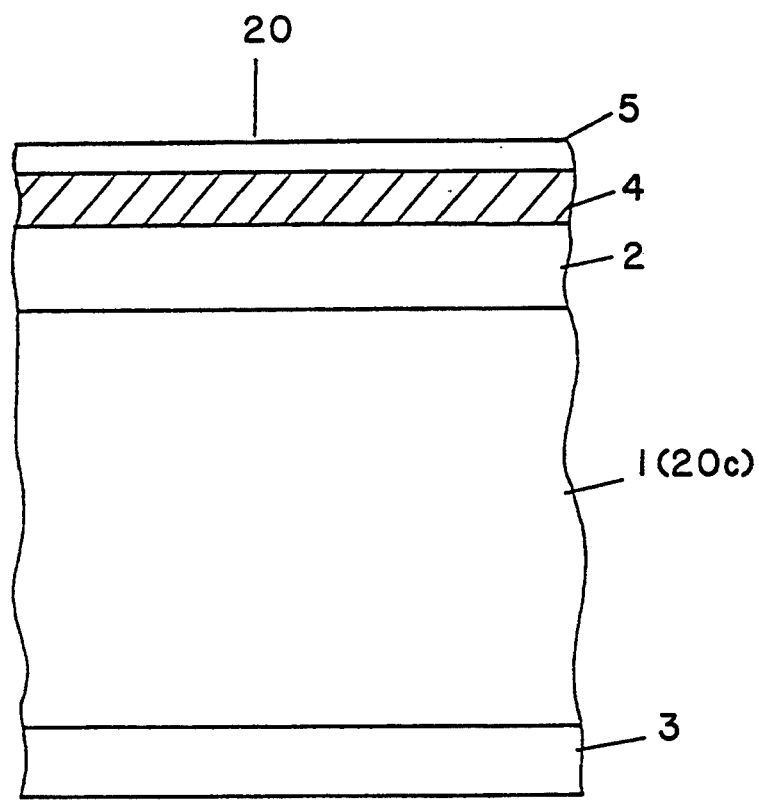
FIG. 1 is a cross sectional view showing the basic arrangement of a magnetic recording medium according to the present invention.

FIG. 1 illustrates the basic arrangement of a magnetic recording medium showing one embodiment of the present invention. As shown, a substrate 1 of non-magnetic material which is preferably a polyester (PET) film of 3 to 20 μm thick is coated at top with a ferromagnetic metal thin film 2 of 0.1 to 0.2 μm formed of Co—Ni alloy by rhombic vapor deposition. Also, the back of the substrate 1 is coated with a back coating layer 3 formed of a mixture of e.g. resin and carbon for enhancement of running performance. The ferromagnetic metal thin film 2 is covered with a protective layer 4 and a lubricant layer 5. In common, the atomic ratio of the hydroxyl group to a primary component metal element, namely Co, contained in the ferromagnetic metal thin film 2 is less than 0.2:1 at the interface between the ferromagnetic metal thin film 2 and the protective layer 4.

Figure 2:
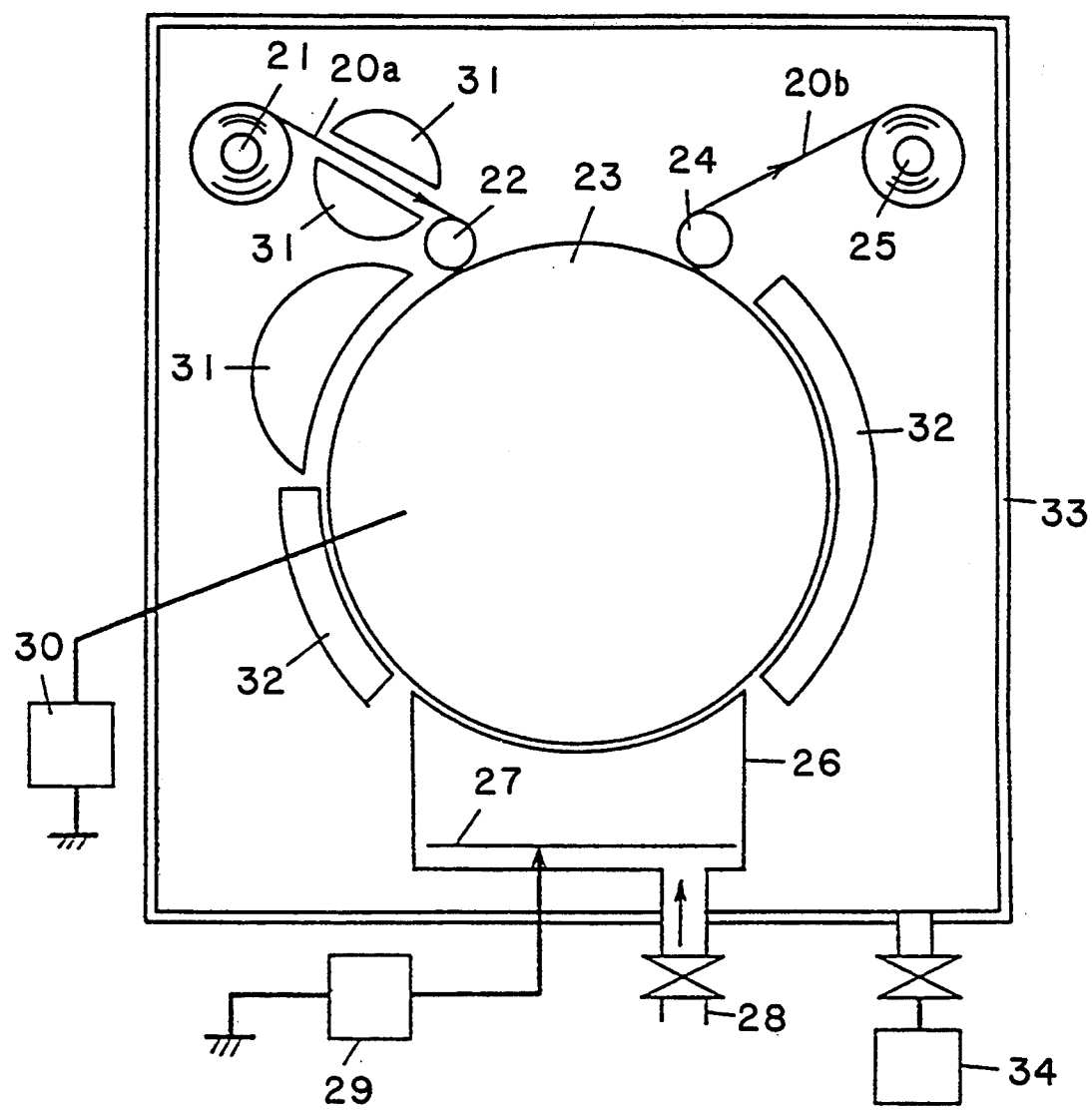
FIG. 2 is a schematic view showing Example 1 of the embodiments of the present invention, in which while a magnetic recording medium having a ferromagnetic metal thin film formed on a non-magnetic substrate being heated by a heat source, e.g. a halogen lamp or heater and the resultant out gas being absorbed by very-low-temperature panels, a protective layer is developed on the ferromagnetic metal thin film of the magnetic recording medium.

As shown in FIG. 2, a magnetic recording medium 20a with no protective layer developed thereon is fed out from a supply roll while its tension is being controlled properly. There are provided a couple of pass rollers 22 and 24 which rotate and act as guides while the magnetic recording medium 20a and a magnetic recording medium 20b coated with a protective layer 4 run along respectively. A main drum 23 which is insulated from a main body of an apparatus and grounded via e.g. a coolant is provided for transfer of the magnetic recording medium 20 at a uniform speed by controlled rotating motion. The magnetic recording medium 20b coated with the protective layer 4 is rewound onto a take-up roll 25 at an equal tension to that in feeding out from the supply roll 21. Also, provided are a plasma nozzle 26 for developing the protective layer 4 and a plasma generating electrode 27 connected to a plasma power source 29. The plasma power source 29 may supply a DC or AC voltage (at 50 Hz to 30 MHz) or a maximum of 7 kv produced by superimposition of such voltages. A gas feeding inlet 28 is provided for supply of reactive gas of e.g. $H_2$, Ar, or $CH$, or vapor gas of e.g. ketone or alcohol group at a partial pressure of 0.001 to 0.5 Torr. The combination of the foregoing components 26 to 29 constitutes a plasma CVD device. Also, a bias power source 30 is provided for supply of a charge to render the running magnetic recording medium 20 in close contact with the main drum 23. In addition, there are provided a heating device 31 consisting mainly of a heat source, e.g. a halogen lamp or heater, and a reflective plate for efficient use of heat, very-low-temperature panels 32 extending along the path of the magnetic recording medium 20, and a vacuum pump 34 for producing a vacuum in a vacuum chamber 33.

The procedure of producing such a magnetic recording medium using the foregoing arrangement will now be described referring to FIG. 2.

It starts with producing a vacuum as low as $10^{-4}$ Torr in the vacuum chamber 33 using the vacuum pump 34. The magnetic recording medium 20a less the protective layer 4 is fed to run with its back wrapping around the main drum 23 during continuously traveling from the supply roll 21 to the take-up roll 25. The heating device 31 when its halogen lamp or heater is energized emits rays of thermal energy which are irradiated onto the surface of the ferromagnetic metal thin film 2 of the magnetic recording medium 20a as partially reflected by the reflective plate so that its temperature rises up. Accordingly, impurities, e.g. water trapped in the ferromagnetic metal thin film 2 under the atmospheric conditions are removed in the form of an out gas by heat towards the interior of the vacuum chamber 33. The out gas released is then absorbed by the very-low-temperature panels 32 and thus, the surface of the ferromagnetic metal thin film 2 becomes purified without involving recontamination of the magnetic recording medium 20a which is in turn transferred to a stage of development of the protective layer 4. At the stage of development of the protective layer 4, a plasma of ionized substances generated by a reactive gas from the gas feeding inlet 28 and a specific rate of voltage from the plasma power source 29 is fired from the plasma electrode 27 towards the magnetic recording medium 20a. The plasma upon reaching the ferromagnetic metal thin film 2 accumulates to develop the protective layer 4 on the same. During application of the plasma, the surface of the ferromagnetic metal thin film 2 carries a minimum amount of hydroxyl contents and remains free from impurities. Accordingly, the protective layer 4 can securely be bonded in chemical coupling onto the ferromagnetic metal thin film 2. An excess of the reactive gas escaped from between the plasma nozzle 26 and the main drum 23 where the magnetic recording medium 20 closely runs through is constantly absorbed by the very-low-temperature panels 32 arranged along the running magnetic recording medium 20, whereby recontamination by the gas on both the uncoated ferromagnetic metal thin film 2 and the finished protective layer 4 will be avoided. Consequently, the still frame life and resistance to corrosion of the magnetic recording medium 20 will be increased.

It is noted that the protective layer 4 of each magnetic recording medium 20 to be used for measurement of practical performance is a diamond-like carbon layer of about 100 angstroms in thickness which is developed on the surface of the magnetic recording medium heated to 80° C. by a heater, while the very-low-temperature panels being set to −150° C., and then, coated with a lubricant layer 5 of about 30 Å thick formed mainly of fluorine-containing carboxylic acid.

As the result, the atomic ratio of the hydroxyl group to the primary component metal element, Co, of the ferromagnetic metal thin film 2 was measured 0.16 to 0.19 at the interface between the ferromagnetic metal thin film 2 and the protective layer 4.

Example 2

Figure 3:
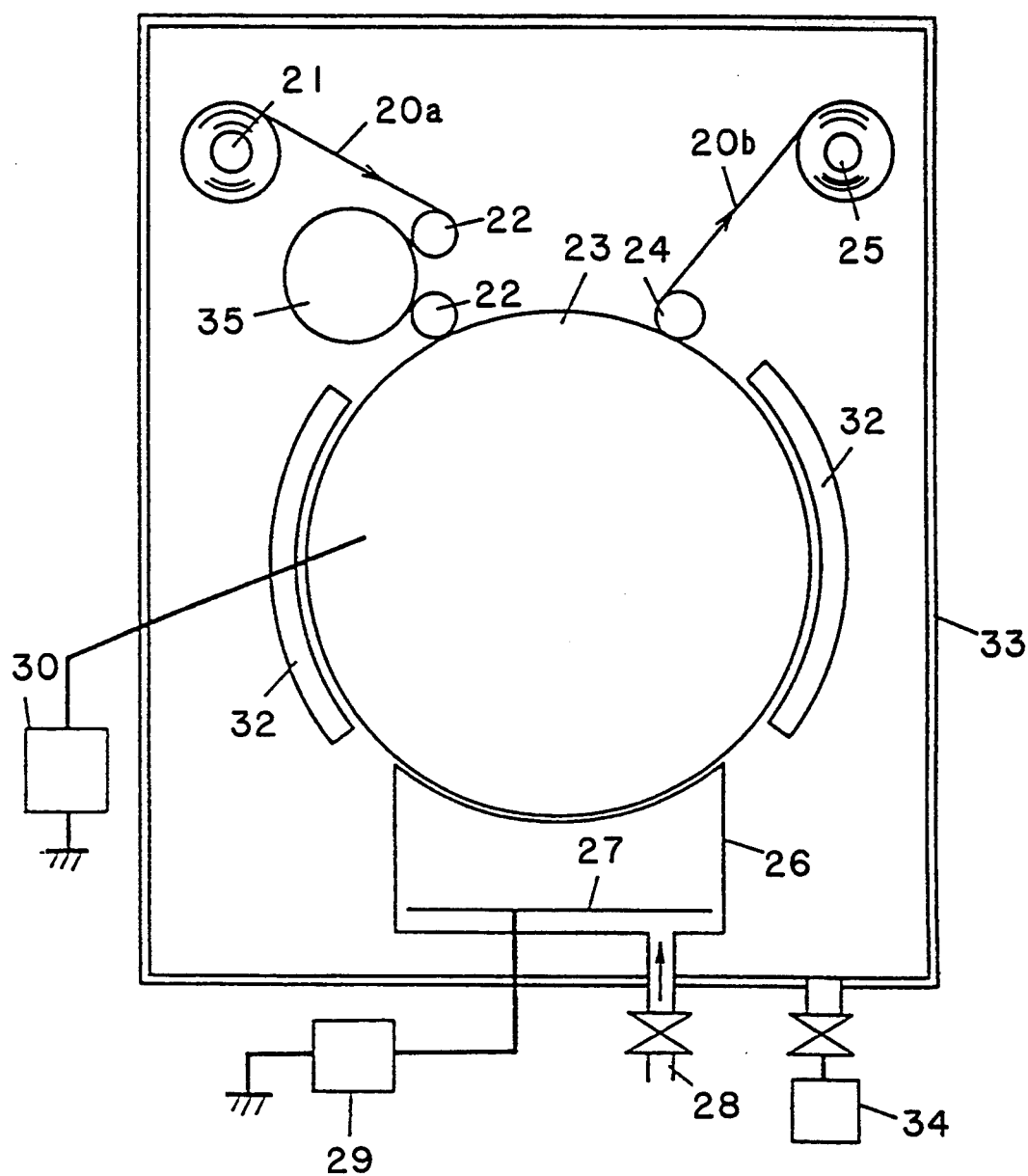
FIG. 3 is a schematic view showing Example 2 of the embodiments of the present invention, in which while a magnetic recording medium having a ferromagnetic metal thin film formed on a non-magnetic substrate being heated by a heater roller and the resultant out gas being absorbed by very-low-temperature panels, a protective layer is developed on the ferromagnetic metal thin film of the magnetic recording medium.

Example 2 employing a heater roller 35 for heating procedure will be described referring to FIG. 3.

This embodiment is distinguished from Example 1 by the fact that the heating device, e.g. a heater or halogen lamp, is replaced with the heater roller 35. The other components of Example 2 are identical to those of Example 1 and will be denoted by like numerals and no further explained.

The method of magnetic recording medium production in this embodiment will now be described in conjunction with the operation of a corresponding apparatus. A magnetic recording medium 20a less a protective layer 4 is fed from a supply roller 21 and transferred through a pass roller 22 to the heater roller 35. The magnetic recording medium 20a upon reaching the heater roller 35 is heated up by the same and thus, releases impurities, which have been trapped under the atmospheric conditions and include water or moisture, in a gaseous form towards the interior of a vacuum chamber 33. The resultant gas released is in turn absorbed by very-low-temperature panels 32 and then, the magnetic recording medium 20a with its surface purified runs further to a stage of protective layer development where its ferromagnetic metal thin film 2 is coated with the protective layer 4 developed by application of plasma ion currents similar to the procedure in Example 1. During the plasma application, the magnetic recording medium 20 is heated up from the back so that it can release impurities from not only the surface but also the inside deep. As the result, the bonding strength between the ferromagnetic metal thin film 2 and the protective layer 4 becomes great. Thus, the still frame life and resistance to corrosion of the finished magnetic recording medium 20 will be increased.

In test production of a magnetic recording medium 20 to be examined for practical performance, the heater roller 35 was maintained at a temperature of 80° C. and the other conditions were the same as of Example 1.

As the result, the atomic ratio of the hydroxyl group to the primary component metal element, Co, of the ferromagnetic metal thin film 2 was measured 0.15 to 0.17 at the interface between the ferromagnetic metal thin film 2 and the protective layer 4.

Example 3

Figure 4:
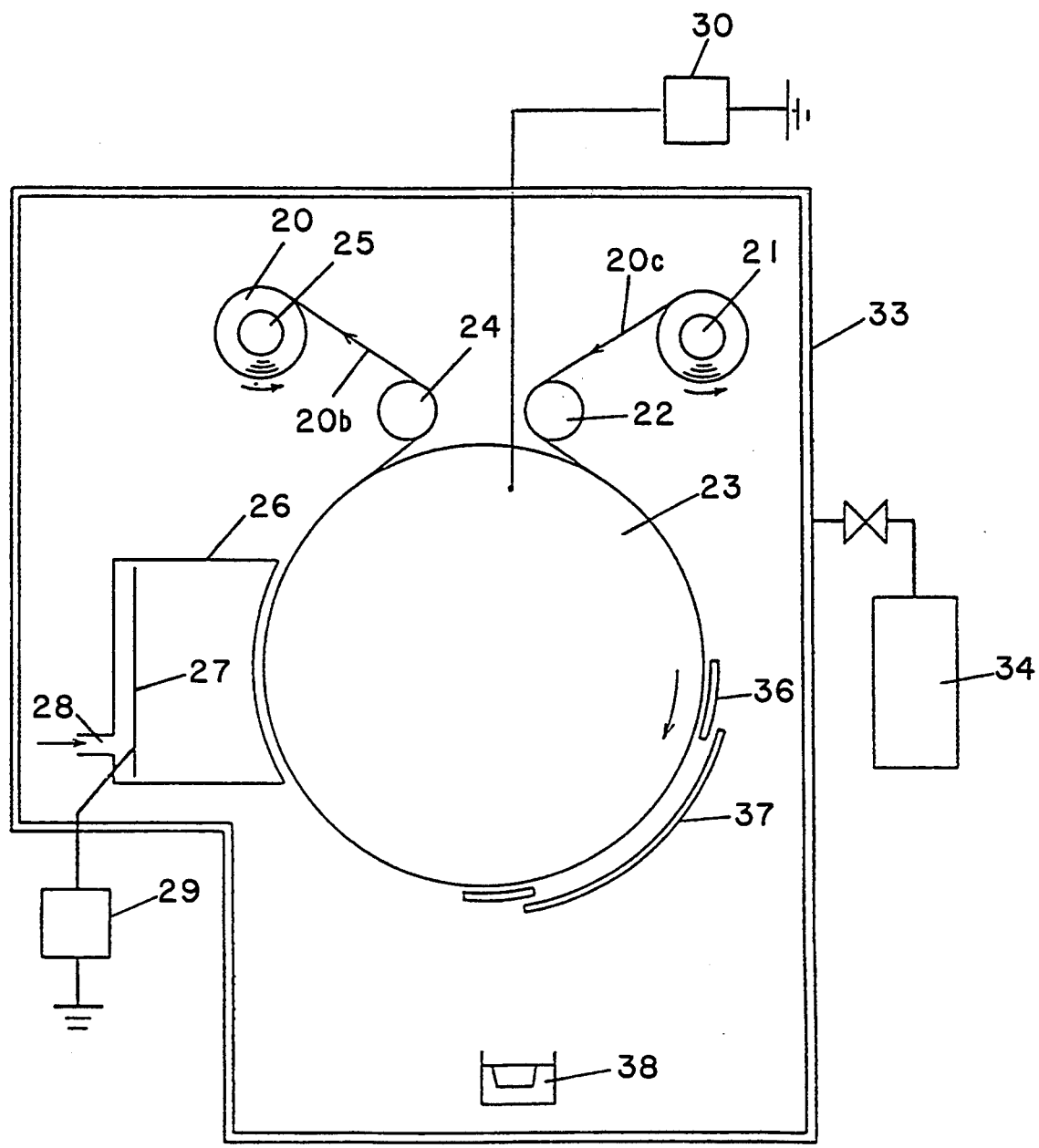
FIG. 4 is a schematic view showing Example 3 of the embodiments of the present invention, in which both a ferromagnetic metal thin film and a protective layer are developed on a non-magnetic substrate of a magnetic recording medium within a vacuum chamber.

FIG. 4 illustrates a schematic view of an apparatus used for carrying out a method of producing a magnetic recording medium according to Example 3 of the present invention. As shown in FIG. 4, a tape of non-magnetic base material 20c on which no magnetic layer nor protective layer is formed is fed out from a supply roll 21 as being properly tensioned under control. There are provided a couple of pass rollers 22 and 24 which rotate and act as guides while the non-magnetic base material 20c and a magnetic recording medium 20 coated with a ferromagnetic metal thin film 2 and a protective layer 4 run along respectively. A main drum 23 which is insulated from a main body of the apparatus and grounded via e.g. a coolant is provided for transfer of the magnetic recording medium 20 at a uniform speed by controlled rotating motion. The magnetic recording medium 20b coated with the protective layer 4 is rewound onto a take-up roll 25 at an equal tension to that in feeding out from the supply roll 21. A mask 36 defining an area of vapor deposition, a shutter 37 adapted for being released when the vapor evaporation reaches a predetermined level, and a vapor source 38 for fusing a vapor deposition metal material to vapor are provided constituting in combination a vacuum processing device for development of the ferromagnetic metal thin film 2. Also, provided are a plasma nozzle 26 for developing the protective layer 4 and a plasma generating electrode 27 connected to a plasma power source 29. The plasma power source 29 may supply a DC or AC voltage (at 50 Hz to 30 MHz) or a maximum power of 7 kv produced by superimposition of such voltages. A gas feeding inlet 28 is provided for supply of reactive gas of e.g. $H_2$, Ar, or CH, or vapor gas of e.g. ketone or alcohol group at a partial pressure of 0.001 to 0.5 Torr. The combination of the foregoing components 26 to 29 constitutes a plasma CVD device. Also, a bias power source 30 is provided for supply of a charge to render the running magnetic recording medium 20 in close contact with the main drum 23. In addition, a vacuum pump 34 is provided for producing a vacuum in a vacuum chamber 33.

The procedure of producing such a magnetic recording medium using the foregoing arrangement will now be described referring to FIG. 4.

It starts with producing a vacuum of given level in the vacuum chamber 33 using the vacuum pump 34. The non-magnetic base material 20c carrying no ferromagnetic metal thin film 2 is fed to run with its back wrapping around the main drum 23 during continuously traveling from the supply roll 21 to the take-up roll 25. At the vacuum processing device, the ferromagnetic metal thin film 2 is developed by accumulating on the non-magnetic base material 20c vapor molecules of a metal material which are generated through fusing the metal material and introduced at a given vapor speed upon releasing of the shutter 37 into the vapor deposition area defined by the mask 36. The magnetic recording medium 20a with the ferromagnetic metal thin film 2 is then transferred to a stage of development of the protective layer 4. At the stage, a plasma of ionized substances generated by a reactive gas from the gas feeding inlet 28 and a specific rate of voltage from the plasma power source 29 is fired from the plasma electrode 27 towards the magnetic recording medium 20a. The plasma upon reaching the ferromagnetic metal thin film 2 accumulates to develop the protective layer 4 on the same. During application of the plasma, the surface of the ferromagnetic metal thin film 2 remains free from impurities at a higher degree. Accordingly, the protective layer 4 can securely be bonded in chemical coupling onto the ferromagnetic metal thin film 2. Consequently, the resistance to climate (or still frame life under low-moisture condition after storage in high-humidity atmosphere) of the magnetic recording medium 20 will be increased.

It is noted that the magnetic recording medium 20 to be used for measurement of practical performance includes a Co-containing magnetic layer of about 1800 Å thick as the ferromagnetic metal thin film 2, a diamond-like carbon layer of about 100 Å thick as the protective layer 4, and a lubricant layer 5 of about 30 Å thick formed mainly of fluorine-containing carboxylic acid.

As the result, the atomic ratio of the hydroxyl group to the primary component metal element, Co, of the ferromagnetic metal thin film 2 was measured 0.11 to 0.14 at the interface between the ferromagnetic metal thin film 2 and the protective layer 4.

Example 4

Figure 5:
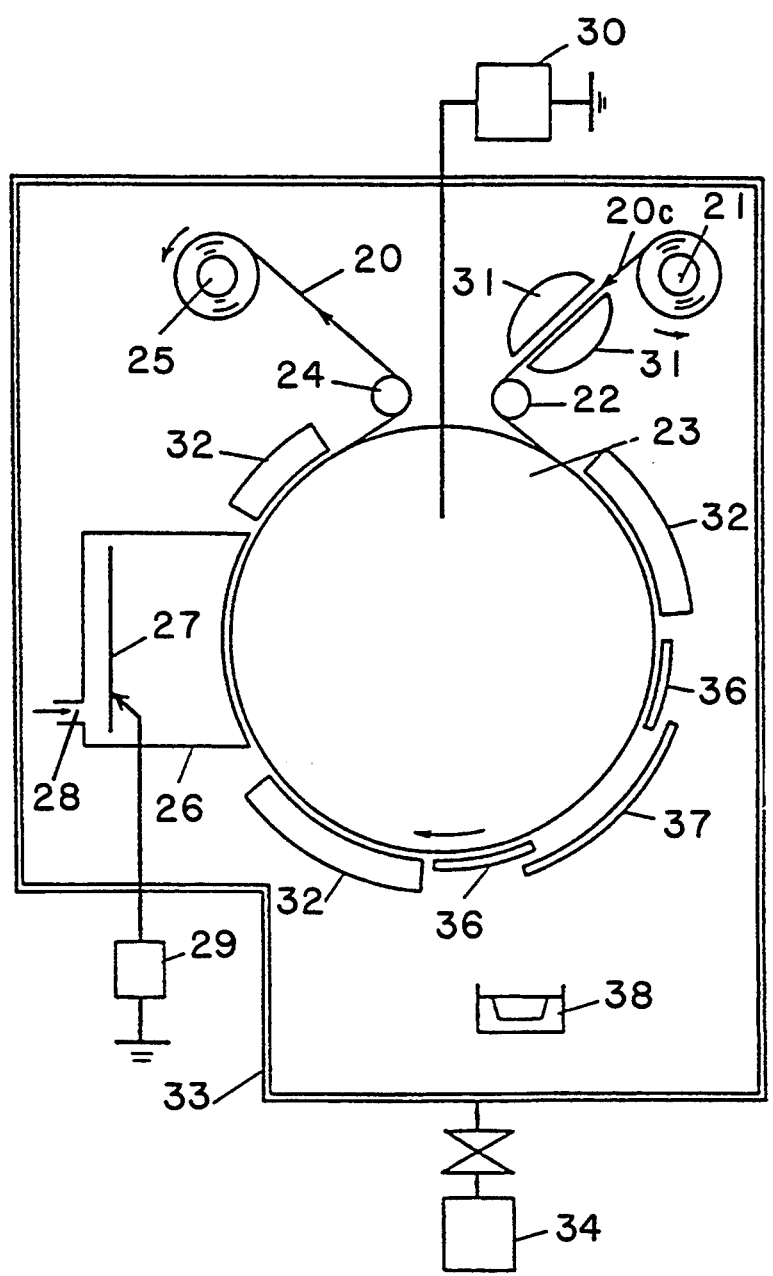
FIG. 5 is a schematic view showing Examples 4 and 5 of the embodiments of the present invention, in which while a non-magnetic substrate of a magnetic recording medium being heated and the resultant out gas being absorbed by very-low-temperature panels, both a ferromagnetic metal thin film and a protective layer are developed on the non-magnetic substrate within a vacuum chamber.

FIG. 5 illustrates a schematic view of an apparatus used for carrying out Example 4 with a method of producing a magnetic recording medium according to another embodiment of the present invention. This embodiment is distinguished from Example 3 by the fact that there are additionally provided a heating device 31 for heating the non-magnetic base material 20c and three very-low-temperature panels 32 extending along the paths of the non-magnetic base material 20c, the ferromagnetic metal thin film 2 of the magnetic recording medium 20b, and the protective layer 4 of the magnetic recording medium 20b respectively. The other components of Example 4 are identical to those of Example 3 and will be denoted by like numerals and no further explained.

The procedure of producing such a magnetic recording medium using the foregoing arrangement will now be described referring to FIG. 5.

Like Example 3, a non-magnetic base material 20c carrying no ferromagnetic metal thin film 2 is continuously fed to run from the supply roll 21 to the take-up roll 25. The heating device 31 when its halogen lamp or heater is energized emits rays of thermal energy which are irradiated onto the surface of the non-magnetic base material 20c as partially reflected by a reflective plate so that its temperature rises up. Accordingly, impurities, e.g. water, carried on or trapped in the non-magnetic base material 20c under the atmospheric conditions are removed by heat towards the interior of a vacuum chamber 33 in the form of an out gas. The out gas released is then absorbed by the very-low-temperature panels 32 and thus, the surface of the non-magnetic base material 20c becomes purified prior to development of both a ferromagnetic metal thin film 2 and a protective layer 4, without involving recontamination of the ferromagnetic metal thin film 2 of the magnetic recording medium 20b and the protective layer 4 of the magnetic recoding medium 20b. Accordingly, during the development, the ferromagnetic metal thin film 2 can securely be bonded onto the non-magnetic base material 20c. Similarly, the protective layer 4 can securely be bonded in chemical coupling onto the ferromagnetic metal thin film 2. Also, an excess of the reactive gas escaped from between the plasma nozzle 26 and the main drum 23 where the magnetic recording medium 20 closely runs through is constantly absorbed by the very-low-temperature panels 32 extending along the paths of their respective magnetic recording mediums 20a and 20b, whereby recontamination by the gas on both the uncoated ferromagnetic metal thin film 2 and the finished protective layer 4 will be avoided. Consequently, the resistance to environmental change (or still frame life under low-moisture condition after storage in high-temperature and high-moisture conditions) of the magnetic recording medium 20 will be increased. After development of the protective layer 4, the out gas released from the magnetic recording medium 20b is absorbed by the third very-low-temperature panel 32 and thus, the finished magnetic recording medium 20 is rewound on the take-up roll 25 without spoiling its protective layer 4. It is hence ensured to securely couple a lubricant layer 5 to the protective layer 4 of the magnetic recording medium 20 at the next step. Accordingly, undesired head clogging caused under a low moisture condition during use of the magnetic recording medium will be minimized.

It is noted that the magnetic recording medium 20 to be used for measurement of practical performance includes a Co-containing magnetic layer of about 1800 Å thick as the ferromagnetic metal thin film 2, a diamond-like carbon layer of about 100 Å thick as the protective layer 4, both being formed on the surface of the non-magnetic base material 20c which is heated to 80° C. by the heating device while the very-low-temperature panels being set to −50° C., and a lubricant layer 5 of about 30 Å thick formed mainly of fluorine-containing carboxylic acid.

As the result, the atomic ratio of the hydroxyl group to the primary component metal element, Co, of the ferromagnetic metal thin film 2 was measured 0.09 to 0.10 at the interface between the ferromagnetic metal thin film 2 and the protective layer 4.

Example 5

Example 5 is distinguished from Example 4 by the fact that the very-low-temperature panels are set to −150° C. The procedure of producing a magnetic recording medium 20 and its corresponding arrangement for measurement of practical performance are identical to those of Example 4 and will no further be explained. In this case, the absorption by the very-low-temperature panels becomes enhanced, whereby the resistance to corrosion of the magnetic recording medium 20 will be more increased.

As the result, the atomic ratio of the hydroxyl group to the primary component metal element, Co, of the ferromagnetic metal thin film 2 was measured 0.08 to 0.085 at the interface between the ferromagnetic metal thin film 2 and the protective layer 4.

For the purpose of comparison, a procedure designated as Comparison 1 was carried out in which a ferromagnetic metal thin film 2 was developed on a base material by a separate vacuum processing device and after exposed to the atmosphere, coated with a protective layer 4. Also, another comparative procedure of Comparison 2 was executed in which a ferromagnetic metal thin film 2 was developed in a like manner as of Comparison 1 and after removal of gas of trapped impurities by heating the magnetic recording medium 20a, coated with a protective layer 4. It would be understood that every protective layer 4 was covered with a lubricant layer 5 prior to measurement for practical performance of the finished magnetic recording medium.

It is noted that the hydroxyl content at the interface between the ferromagnetic metal thin film and the protective layer and the primary component metal element contained in the ferromagnetic metal thin film were measured by an X-ray photo-electron spectral analysis method. More particularly, after both the lubricant and protective layers of the magnetic recording medium 20 had been ion etched, the amount of Co and O(oxygen) elements at the interface were measured upon detection of the primary component metal element, Co, of the ferromagnetic metal thin film. The atomic ratio of OH radical to Co was calculated by dividing the intensity of hydroxyl contents by the intensity of Co through correction of the intensity of OH and Co with a sensitivity ratio. The result will be termed as a hydroxyl ratio hereinafter.

The advantageous results of the foregoing embodiments will now be described referring to Table 1.

More specifically, the assessment of magnetic recording media 20 produced by the methods of the present invention and the other comparative prior art methods listed in Table 1 will be explained in the respects of head clogging under low moisture condition, length of still frame life under low moisture condition, and resistance to corrosion.

TABLE 1

Measurements list of Examples and Comparisons

| Type of Medium | Temperature of low-temp panel | Hydroxyl ratio OH/Co | Head clogging sec/100 hrs | | Still frame life (3× load/min) | | Resistance to corrosion (Still frame life at 23° C. 10% with 3× load/min after left in 40° C. 90%) | | | | |
|---|---|---|---|---|---|---|---|---|---|---|---|
| | | | Result | 23° C. 10% | 23° C. 70% | 23° C. 10% | Result | Start | 1st week | 2nd week | 4th week |
| Example 1 | −150° C. | 0.16–0.19 | △ | 10 | >180 | 120–150 | △ | >180 | 90 | 60 | 30 |
| Example 2 | −150° C. | 0.15–0.17 | △ | 10 | >180 | >180 | △ | >180 | 120 | 90 | 45 |
| Example 3 | No | 0.11–0.14 | × | 20 | >180 | >180 | ○ | >180 | 150 | 90 | 60 |
| Example 4 | −50° C. | 0.09–0.10 | ○ | 5 | >180 | >180 | ○ | >180 | 150 | 120 | 90 |
| Example 5 | −150° C. | 0.08–0.085 | ◉ | 2 | >180 | >180 | ◉ | >180 | >180 | >180 | 150 |
| Comparison 1 | No | 0.25–0.28 | × | 30 | 90–120 | 60–90 | × | 120–150 | 60 | 30 | 10 |
| Comparison 2 | No | 0.20–0.25 | × | 20 | 120–150 | 90–120 | × | >180 | 80 | 40 | 20 |

The procedure of assessment for each respect will be described.

The head clogging was examined using a 90-minute length of 8-mm magnetic recording tape 20 which was passed for recording video signals at a speed of 14 mm/sec under a temperature of 23° C. and a relative humidity of 70% along a 40-mm diameter recording drum of a video taperecorder having two pairs of 30-μm projecting record/playback heads and a track pitch of about 20 μm and rotating at a relative speed of 3.8 m/sec. After the magnetic recording tape was driven for playback for about 200 hours under 23° C. and 10% RH conditions, the clogging time was measured and converted to a value per 100 hours. The clogging time is defined as a finite duration throughout which a drop of more than 6 dB in the playback output continues.

The length of still frame life was examined using a similar magnetic recording tape which was driven for recording under 23° C. and 70% RH conditions and for playback under both 23° C./70% RH and 23° C./10% RH conditions while being loaded three times the common movement on the same video taperecorder. It was determined that the still frame life ends when no normal output is reproduced from the ferromagnetic metal thin film 2 of the recording medium 20 which is injured. The resistance to corrosion was examined using a magnetic recording medium 20 which was recorded on the same video taperecorder as in the still frame life measurement, left behind under 40° C. and 90% conditions, and measured under 23° C. and 10% RH conditions while about two times the load exerted during examining the still frame life was applied weekly. Table 1 shows the measurements recorded at the first and fourth week after starting.

As apparent from the measurements in Table 1, the head clogging is less occurred than in Comparisons except Example 3. The magnetic recording media of Example 4 and 5 in which each coating is formed after the non-magnetic substrate has been heated are much improved in this respect.

The still frame life is also improved as clarified in Examples where the hydroxyl ratio is less than 0.2.

Accordingly, it can be explained that the head clogging is decreased because the bonding strength between the lubricant layer and the protective layer becomes increased. More specifically, unwanted water or moisture carried on and trapped in the magnetic recording medium is minimized by heating the non-magnetic base material prior to coating operation and utilizing the very-low-temperature panels and also, during production, the protective layer remains dried and prevented from undesired transfer of moisture from the non-magnetic base material and its back coating. Hence, the bonding strength between the lubricant layer and the protective layer is enhanced so that physical assaults on the magnetic recording medium by the heads during running can be lessened.

Also, it would be understood that the improvement in the still frame life and the resistance to corrosion results from a decrease in the amount of hydroxyl contents on the surface of the ferromagnetic metal thin film. In more detail, the decrease of the hydroxyl group intends to discourage the shift of metal oxide to metal triggered by reduction with hydrogen ions generated during plasma application for development of the protective layer. Hence, the chemical bonding reaction of the metal oxide is enhanced and also, the oxidation of metal to hydroxide during storage under high-temperature and high-moisture conditions is avoided. As the result, the chemical bonding remains assured and no declination in the bonding strength will be permitted.

What is claimed is:

1. A method of producing a magnetic recording medium comprising the steps of:

forming a ferromagnetic metal thin film on a non-magnetic substrate;

heating both the non-magnetic substrate and the ferromagnetic metal thin film by a heat source in a vacuum chamber;

forming a protective layer on the ferromagnetic metal thin film by a CVD method in said vacuum chamber; and passing the thin-film-formed substrate adjacent to a panel which is set to less than −50° C. at least before or after forming the protective layer in said vacuum chamber.

2. The method of producing a magnetic recording medium according to claim 1, wherein the step of forming the ferromagnetic metal thin film on the non-magnetic substrate is performed in said vacuum chamber.

* * * * *